April 9, 1968 R. T. BURNETT 3,377,076
RETURN SEAL
Filed Oct. 22, 1965

INVENTOR.
RICHARD T. BURNETT
BY
Sheldon F. Rogers
ATTORNEY

United States Patent Office 3,377,076
Patented Apr. 9, 1968

3,377,076
RETURN SEAL
Richard T. Burnett, South Bend, Ind., assignor to The Bendix Corporation, a corporation of Delaware
Filed Oct. 22, 1965, Ser. No. 501,660
2 Claims. (Cl. 277—171)

ABSTRACT OF THE DISCLOSURE

A disc brake seal which, in addition to performing a sealing function, acts to controllably return a fluid-actuated piston to its released position.

---

It is an object of this invention to provide a fluid motor with a seal construction which is capable of returning a piston through a more pronounced stroke than is possible in prior constructions.

Figure 1:
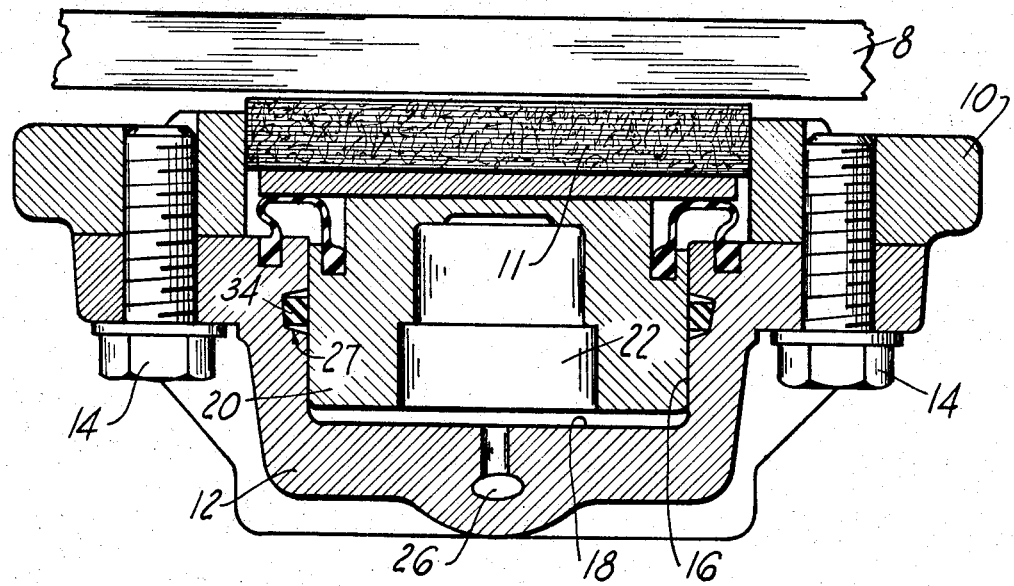
Figures 2, 3:
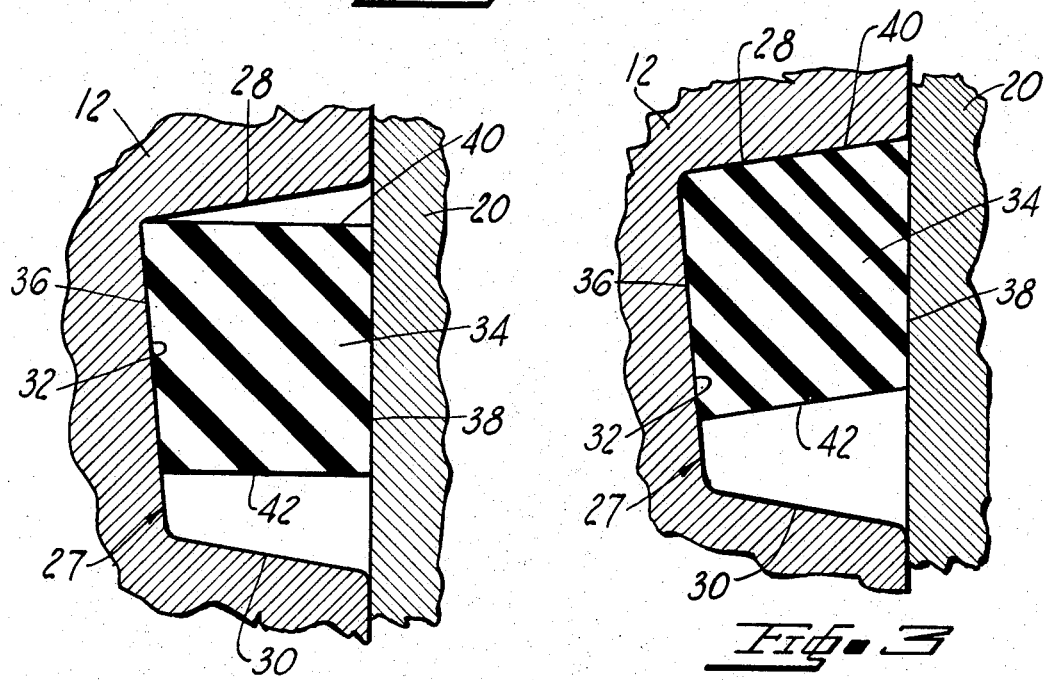

Other objects of the invention will become apparent from the following description with reference to the drawings wherein:

FIGURE 1 is an assembly drawing of a disc brake;
FIGURE 2 is an enlarged view of a seal construction of FIGURE 1 illustrated in its released position; and
FIGURE 3 is an enlarged view of the seal construction of FIGURE 1 illustrated in its brake applied position.

Referring to the drawing, only one-half of a well known stationary caliper and a disk 8 is illustrated with it being understood that the half of the caliper on the opposite side of the disk 8 is the same. A stationary stirrup 10 is secured to a fixed part of a vehicle (not shown) and has an opening therein slidably receiving a brake shoe 11. A cylinder housing 12 is secured by bolts 14 to the stirrup 10 and comprises a bore 16 open at its front end and closed at its rear end by a wall 18. A piston 20 is slidably disposed in the bore 16 for slidable movement in a forward brake applying direction and for slidable movement in a rearward brake release direction. An axially extending recess 22 is provided in the piston 20 and in conjunction with the end wall 18 and bore 16 defines a fluid chamber. A fluid inlet port 26 communicates the fluid chamber with fluid from a master cylinder (not shown).

Referring to the enlarged view of FIGURE 2, an annular groove 27 is provided in the wall of the bore and is defined by a front annular edge 28, a rear annular edge 30 and an annular edge 32 which extends transversely to and joins the edges 28 and 30. A resilient annular seal 34 is located in the groove 27 and is compressed between the wall of the piston 20 and the edge 32 of the groove 27 with a radial outer face 36 thereof sealingly engaging the edge 32 and a radial inner face 38 slidingly and sealingly engaging the piston 20. The front edge 28 is sloped from the edge 32 in a forward direction to provide a space between a front face 40 of the seal and the edge 28. The axial length between the front face 40 and a rear face 42 of the seal is slightly less than the axial length of the edge 32 and the rear edge 30 of the groove is sloped from the edge 32 in a rearward direction to provide a space between the rear face 42 of the seal and the rear edge 30 of the groove. This space is provided to allow for internal swell of the seal.

The space between the front edge 28 of the groove 27 and the front face 40 of the seal 34 is provided to allow flexing of the seal 34 thereinto during brake application as shown in FIGURE 3. This flexing is due to the actuating fluid pressure acting on the face 42 urging the seal 34 forwards and the frictional connection between the face 38 and the piston 20 resulting in the piston dragging the seal 34 forwards during the applying stroke of the piston. Once the face 40 engages the edge 28, the actuating fluid pressure acting on the face 42 and the frictional drag between the seal 34 and the piston 20 will result in compressing the seal against the edge 28. When fluid pressure is released, the seal will return to its brake released position as shown in FIGURE 2, carrying with it the piston 20 whereby the piston is returned to released position (FIGURE 2).

It can be seen from the drawing that due to the space between the edge 28 and the face 40 the seal flexes and the face 38 of the seal travels until the face 40 fully engages the edge 28. This means that the face 38 must travel the same distance in returning to its released position. In prior constructions, the seal fully engages the front edge of the groove when in its released position and the fluid actuating pressure compresses the seal against the front edge. Therefore, the only return movement the seal can impart to the piston is the movement of the seal from its compressed condition during brake application to its normal condition when in released position. Thus, there is a much greater return stroke imparted on the piston by the seal 34 than the return stroke imparted on the piston by the seals of prior constructions.

It is my intention to include within the scope of the following claims all equivalent applications of the invention whereby the same or substantially the same results may be obtained.

I claim:
1. In a disc brake, fluid motor, a cylinder housing having a bore therein, a piston slidably disposed in said bore for forward movement in a brake applying direction and rearward movement in a brake release direction, an annular groove in the wall of said bore, said groove being defined by a pair of axially spaced edges extending transverse to the wall of said bore and an edge extending transverse to and joining said axially spaced edges, a resilient annular seal disposed in said bore, the boundary of said seal being defined by two axially spaced faces joined by an inner face and an outer face spaced radially outwards from said inner face, said outer face of said seal sealingly engaging said joining edge of said groove, said inner face of said seal sealingly and slidingly engaging said piston, at least a portion of the forwardmost face of said axially spaced faces of said seal being spaced from the forwardmost edge of said groove, the juncture between said forwardmost face and said outer face of said seal engaging the juncture between said forwardmost edge and said joining edge of said groove, said forwardmost edge of said groove being sloped in a forward direction to provide a space between said forwardmost edge and said forwardmost face of said seal, whereby said seal is compressed into said space against said forwardmost edge of said annular groove during forward movement of said piston in a brake-applying direction and upon brake release said seal will return to its released position, thereby returning the piston to its released position.
2. The structure as recited in claim 1, wherein said space between said forwardmost edge and said forwardmost face is preselected in accordance with the dimensions of said seal in order to determine the brake-release position of said piston.

References Cited
UNITED STATES PATENTS
3,218,051  11/1965  Doetsch _____ 277—177 X SAMUEL ROTHBERG, *Primary Examiner.*